United States Patent

[11] 3,557,973

| [72] | Inventors | Christian Edmand Bussienne<br>Louviers;<br>Dominique Christian Mary, Codebec-les-Elbeuf, France |
|---|---|---|
| [21] | Appl. No. | 776,073 |
| [22] | Filed | Nov. 15, 1968 |
| [45] | Patented | Jan. 26, 1971 |
| [73] | Assignee | "Constructions Mills-K"<br>Saint-Quen, France |
| [32] | Priority | Nov. 23, 1967 |
| [33] | | France |
| [31] | | 129,312 |

[54] AUTOMATIC TRANSFER DEVICE DESIGNED FOR A DYNAMIC STORAGE INSTALLATION
3 Claims, 8 Drawing Figs.

[52] U.S. Cl. .................................................. 214/16, 104/48
[51] Int. Cl. .................................................. B65g 1/06

[50] Field of Search ............................... 214/16B, 16.4, 16.42, 38.24, 16.18A; 104/48

[56] References Cited
UNITED STATES PATENTS

| 2,919,657 | 1/1960 | Wack ........................... | 104/48 |
| 3,173,557 | 3/1965 | Eliassen ....................... | 214/16(B) |

*Primary Examiner*—Robert G. Sheridan
*Attorney*—William A. Drucker

ABSTRACT: The present invention relates to dynamic storage installations of the type including a plurality of storage channels along which pallets or other loads may be conveyed.

The instant invention more particularly provides a transfer carriage adapted for introducing or removing the loads at the ends of any preselected channel; said transfer carriage includes centering means enabling it to make an exact connection at said ends.

AUTOMATIC TRANSFER DEVICE DESIGNED FOR A DYNAMIC STORAGE INSTALLATION

The present invention relates to an electromechanical device whose purpose is to carry out certain transfers in a dynamic storage installation.

Various devices are already known, whose purpose is to transfer pallets, outside of he storage channels of a storehouse. In the storage channel itself, the displacement of the pallets or other loads takes place, either manually or by means of special conveyors, of which an improved and particularly advantageous model will be mentioned hereinbelow.

Known devices have been more especially designed for the purpose of transferring pallets from one level to another of the installation. These devices are not well adapted to the specific problem raised by the introduction of the pallets at the opening of a storage channel selected at will in a predetermined level of a dynamic storage installation, and by the taking up of the pallets at the exit of such a channel.

It is an object of the present invention to provide by means of a simply constructed transfer carriage adapted for solving this problem, said transfer carriage being provided with centering, and electric and mechanical connecting means, enabling it to make an exact connection at one end of a dynamic storage channel and to cooperate with said channel and a control circuit cooperating with said transfer carriage for making it possible both automatically to load and unload the preselected channel.

According to a feature of the invention, this transfer carriage moves on rail tracks provided in one or the other of the input and output channels located at the respective ends of the storage channels of a given level of the installation, under the action of an electric braking motor, energized by a main supply duct running parallel with the tracks, through he agency of a controlling electric circuit capable of stopping the braking motor when the carriage is essentially facing a preselected storage channel, a centering device, controlled by an electric jack, putting then into alignment, on the one and, the tracks of the storage channel with two auxiliary track portions mounted in the transfer carriage in a perpendicular direction to the tracks on which it moves, and on the other hand, electric duct portions respectively mounted on the transfer carriage and along the storage channel in a perpendicular direction to the main duct. Thanks to this electric and mechanical connection of the transfer carriage and storage channel, the conveyor which is provided thereon can penetrate into the transfer carriage while its electric energization is being continued, which makes it possible to automatically load or unload a pallet or even carry out the transfer of a conveyor from one storage channel to another, the controlling electric circuit being provided so that these operations will not interfere with the conveyor's cycle of operation. Other features, as well as the advantages of the invention will appear more clearly from the following description.

In the appended drawings:

FIG. 5 is a plan view of a preferred embodiment of the transfer carriage which

Figure 1:
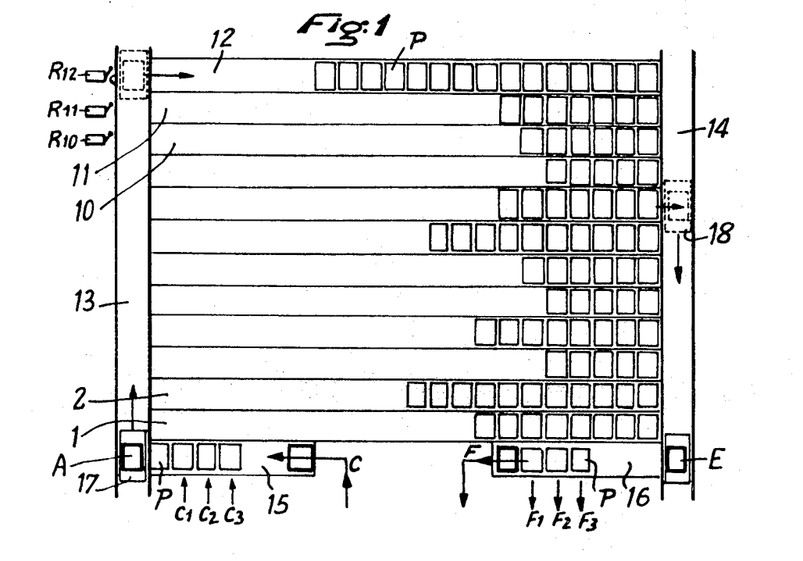
FIG. 1 is a diagrammatic view, from above, of one of the levels of a dynamic storage installation according to the invention.

FIG. 1 shows diagrammatically one of the levels of a dynamic storage installation, i.e., an assembly of storage channels, numbered from 1 to 12, for example, and provided in one and the same plane.

An input channel 13 and output channel 14 are arranged in said plane, in a perpendicular direction to the storage channel.

At end A of the input channel, is a loading channel 15, forming a cradle for the introduction of objects to be stored (for example, pallets P).

The pallets are introduced at input C of channel 15 and are accumulated at its output A by means of a device which automatically loads the pallets at C, unloads them at A, and regroups them in channel 15. This device, which also equips each each of the storage channels, as well as the unloading channel 16, is advantageously of the type described in U.S. Pat. application filed on Oct. 16, 1967 under Ser. No. 675,679, now U.S. Pat. No. 3,458,060, by applicant for: "Electromechanical installation for transferring loads along a horizontal pathway."

It will be referred to hereinbelow as a "transrobot" so as to conveniently distinguish it from the device (17-18) with which channels 13 and 14 are equipped and which will be referred to as a "transfer carriage."

The transrobot of channel 16 takes the pallets at the end E of channel 14, and accumulates them towards the output F of channel 16.

It should be well understood that this invention does not essentially relate to the method and equipment used for the displacement of the pallets in the loading, storing and unloading channels, but mainly to the action of the transfer carriage. It would be possible, in particular, without departing from the spirit of the invention, to eliminate channel 15 and directly feed point A with pallets; similarly, channel 16 could be eliminated and the pallets could be directly taken up at E. In certain cases, on the contrary, it might be useful to provide lateral access of the pallets to channels 15 and 16. This has been shown in the form of arrows $C_1$, $C_2$, $C_3$ and $F_1$, $F_2$, $F_3$.

Finally, the installation according to the invention may, in certain cases, consist only of, either an input channel 13, provided with a transfer carriage, or of an output channel 14 provided with a transfer carriage. The transfer carriage, of which a preferred embodiment will be described hereinbelow, has a double function: on the one hand, it provides for automatic displacement of a pallet from point A or E of the channel in which it moves about towards the corresponding end of any one of the storage channels; on the other hand, it can automatically transfer a transrobot from one storage channel to another.

Figure 2:
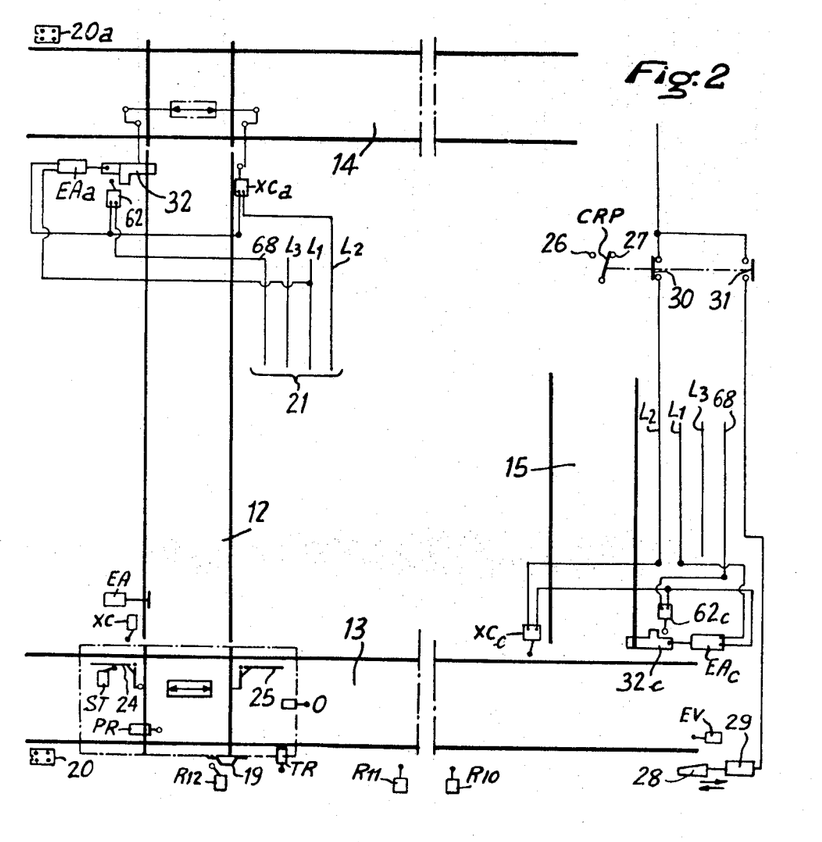
FIG. 2 shows, on a larger scale, a storage channel, the input and output channels, and a loading cradle of the input channel of the installation.

FIG. 2 shows channels 13, 14 and 15 and any storage channel, for example, 12. In front of each one of the storage channels, reference contacts $R_1$ to $R_{12}$ are supported by the framework of the installation. These contacts, which are normally closed, open when the transfer carriage is located at the entrance of the corresponding channel. This opening is effected by a cam 19 supported by the chassis of the transfer carriage.

Figure 3:
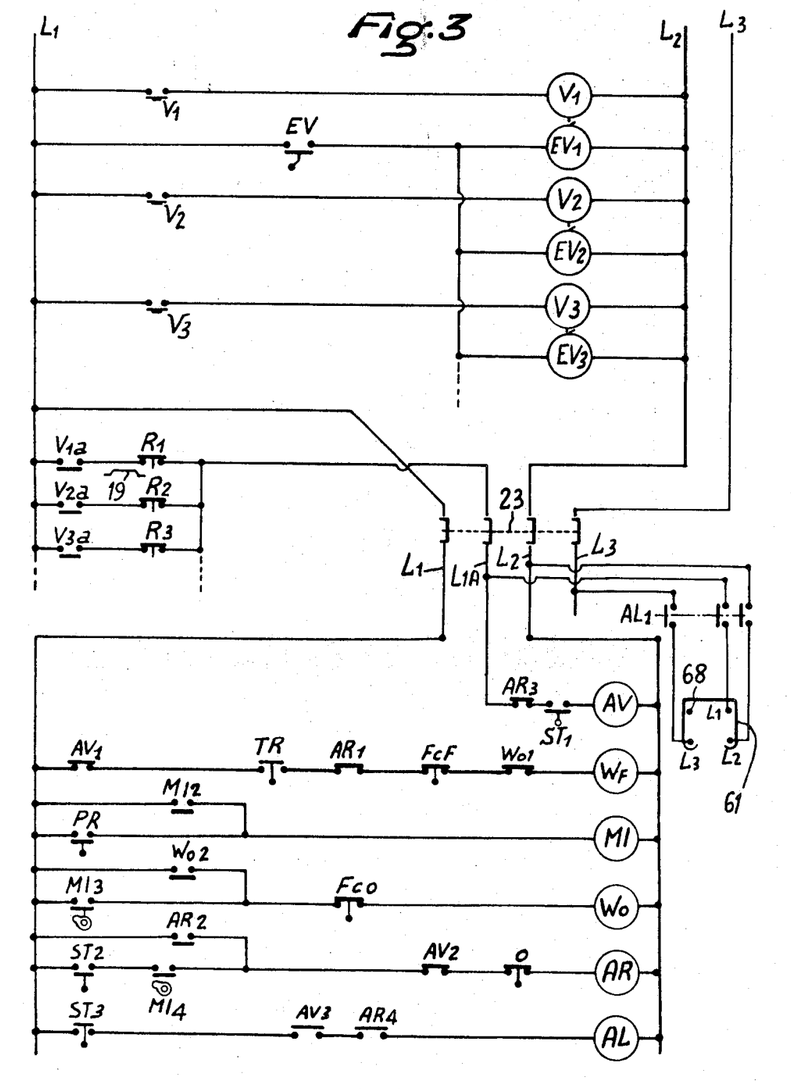
FIG. 3 is a diagram of the transfer carriage control circuit.

The framework of the installation also supports, at the entrance of channel 13, pushbuttons $V_1$ to $V_{12}$ which the operator uses to display the destination channel of the pallet loaded onto the transfer carriage. The buttons control, by means of the circuit shown in FIG. 3, the energization of corresponding coils $V_1$ to $V_{12}$ which themselves control the closing of auxiliary contacts $V_1a$ to $V_{12}a$ (FIG. 3).

At the end A of channel 13, a contact EV, supported by the framework, is closed when the transfer carriage arrives at this point. The closing of this contact controls (FIG. 3) the energization of coils $EV_1$ to $EV_{12}$. Each coil, such as $V_1$, is associated with a corresponding coil, such as $C_1$, in such a way that the energization of $V_1$ will cause the deenergization of $EV_1$ and vice versa. The closing of contact EV, therefore, causes the display of the pallet destination to be erased, upon return of the transfer carriage at A.

A switch CRP (FIG. 2) as will be explained later, is in position 26 when it is desired to effect the transfer of a transrobot, and in position 27 when it is desired to effect the transfer of a pallet. The components that have just been described and are shown in the upper half of the diagram in FIG. 3, are supported by the framework of the installation and energized via a supply duct 20 which runs parallel to channel 13 and comprises three conductors $L_1$, $L_2$, $L_3$ corresponding to the three phases of the three-phase main, and an additional conductor $L_{1A}$. A second identical supply duct 20a is mounted parallel to the channel 14, while ducts, such as 21, are mounted on the frame work of each one of the storage channels.

Figure 5:
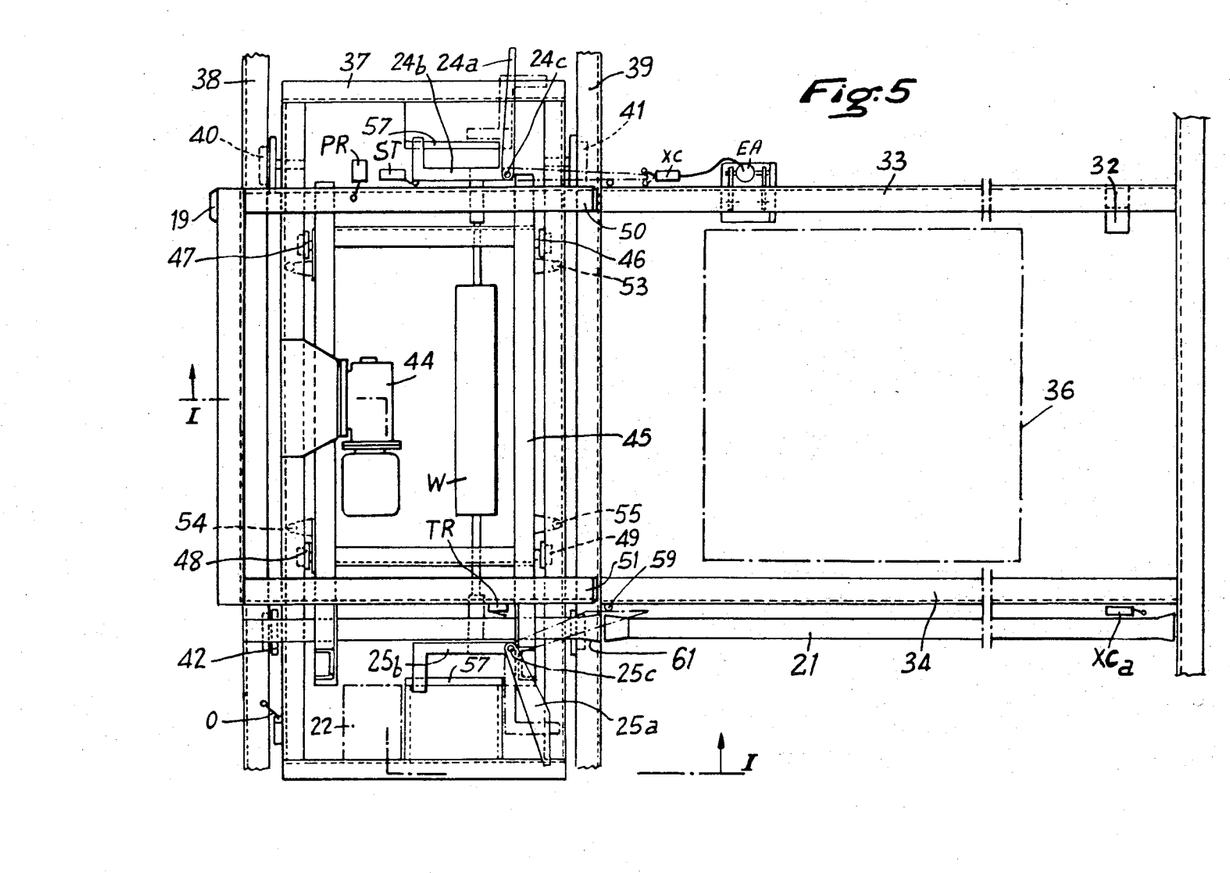
Figure 6:
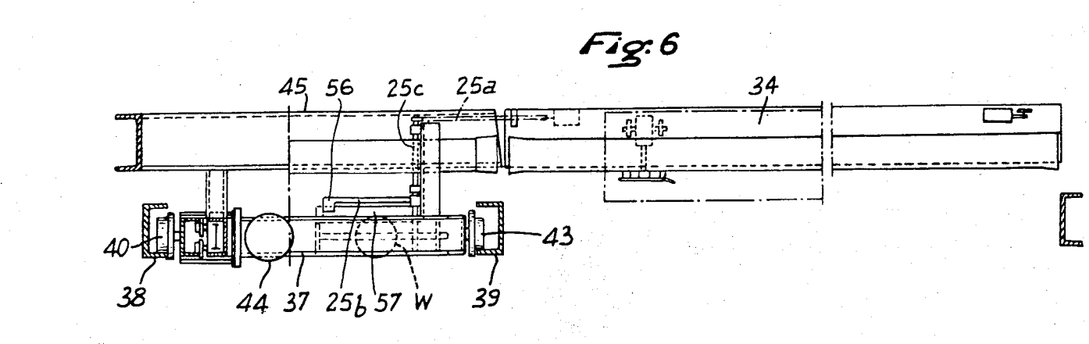
FIG. 6 shows as a cross-sectional view along I–I in FIG. 5 in the right-hand part and as a front view in the left-hand part and in FIG. 7, as an elevation, seen from the storage channel.
Figure 7:
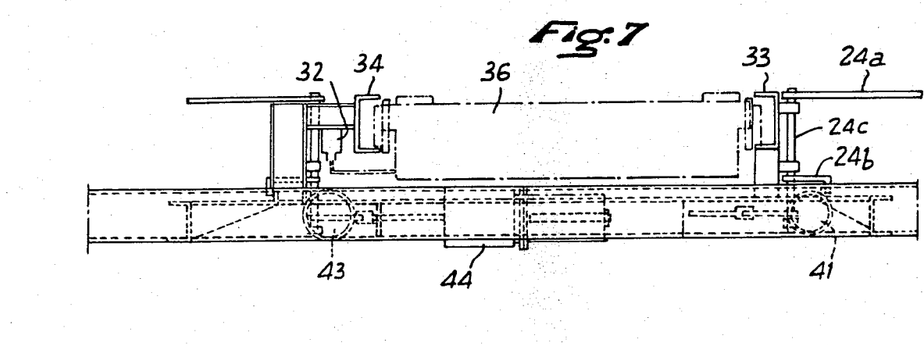

Finally, the transrobot is energized, when it is located in the transfer carriage via a duct 61, (FIG. 5) provided that contacts $AL_1$, controlled by a coil AL (FIG. 3) are closed. The lower half of FIG. 3 shows components mounted on the transfer carriage, inside a box 22 (FIG. 5). A trolley 23, (FIG. 3) attached to the chassis of the transfer carriage, moves along the duct (20 or 20a) and provides the energization of these components. Said components comprise a relay AV which controls the forward motion of the transfer carriage, and a relay AR which controls its backward motion. Relay AV has three auxiliary contacts $AV_1$, $AV_2$ and $AV_3$, which are open when the transfer carriage is moving forward, while relay AR has four auxiliary contacts $AR_2$, which is closed when the transfer carriage is moving backwards, and $AR_1$, $AR_3$ and $AR_4$ which are open when the transfer carriage is moving backwards. As will be explained later in detail, referring to FIG. 5, the transfer carriage is provided with a jack which, upon stopping of said carriage, controls the operation of the carriage centering arms with respect to the storage channel in front of which it is to be brought. The opening and closing of this jack W are respectively controlled by two coils WO and WF. Coil WO controls two auxiliary contacts $WO_1$ and $WO_2$. End of stroke contacts FCO and FCF, which are generally incorporated into the jack, open at the end of the jack opening and closing strokes respectively. As will be explained in detail hereinbelow, the transfer carriage comprises a main chassis and a secondary chassis. The latter can move within the main chassis, with respect to it, when the centering arms (shown diagrammatically at 24-25, FIG. 2), are closed.

It is therefore necessary that said arms be open during the motion of the transfer carriage along path 13 or 14. This open condition of the arms is noted by the action of a safety contact component ST, which then closes two contacts $ST_1$, $ST_2$ while opening a contact $ST_3$. It is only during the centering operation, which will be described later, that the jack, through its own closing operation, provides for closing of the arms. At the end of the transfer carriage return stroke at point A, a contact O, (FIG. 2) supported by said carriage, and which is normally closed, comes to rest against the framework and opens. As will be explained later, the transrobot assigned to each storage channel, or to the output cradle, penetrates into the transfer carriage so as to load and unload it. The penetration of the transrobot into the transfer carriage is conveyed as a closing of a contact PR (FIG. 2). This transrobot moves on tracks comprising the storage channel, (such as 12) and a contact XC, attached to the end of said track (FIG. 2) is closed by the centering arms at the end of the latter's action, as will be explained later. The closing of contact XC energizes, through a circuit, not shown, an electromagnet EA mounted onto the framework of the storage channel (FIG. 2). This electromganet controls the start of the transrobot's backward motion in a manner to be explained later.

Furthermore, the closing of contact PR results in the release of a timing mechanism MI, which controls three contacts $MI_2$ to $MI_4$.

Figure 4:
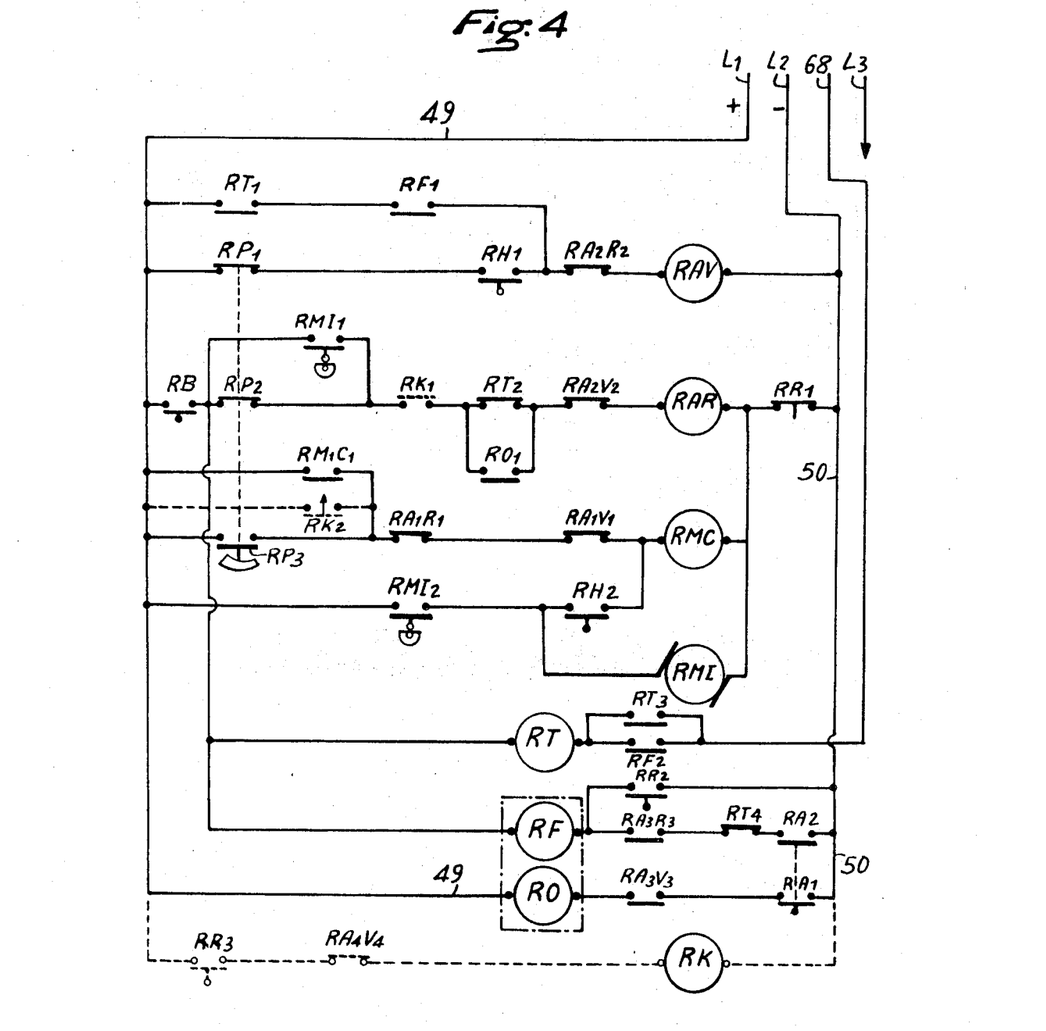
FIG. 4 is a diagram of the conveyor control circuit which is provided in a storage channel, according to a preferred embodiment.

The transrobot control circuit is preferably provided in accordance with FIG. 4, i.e., it is slightly modified with respect to the one shown in FIG. 8 of the U.S. Pat. application referred to above.

This circuit is fed by duct 21 (FIG. 2), which comprises, in addition to the phase conductors $L_1$, $L_2$, $L_3$, an additional conductor 68.

FIG. 4 shows the same components as in FIG. 8 of said U.S. application, referred to by the same reference symbols preceded by the letter R. In addition, other components can be seen in dotted line form designed to clearly show the modifications which had to be introduced into the transrobot control circuit so as to adapt it to the needs of this invention;

$RR_3$: reverse end of stroke contact, this contact closes when the transrobot, moving backwards in the transfer carriage, meets a cam, not shown, supported by said carriage.

RK: contactor triggered by the closing of $RR_3$.

$RK_1$: contact instantaneously controlled by RK.

$RK_2$: delayed action contact controlled by RK.

$RA_4$ $V_4$: normally closed contact, opening when RAV is energized.

The circuit shown in FIG. 3 comprises, in addition to the already-mentioned components, a contact TR, in series with $AV_1$, $AR_1$, FCF, $WO_1$ and WF. This contact is supported by the transfer carriage as shown in FIG. 2 and is normally closed. It opens, thus preventing the energization of coil WF, when the transfer carriage passes in front of a cam 28 (FIG. 2), provided the latter is located in its path. Cam 28 is displaced by an electromagnet 29, so that it is located on the path of contact TR when this electromagnet is energized, which occurs when contact 31 is closed, i.e., when switch CRP is in position 26. The operation of the installation will now be described, starting with the following set of conditions:

transfer carriage stopped at A, centering arms in the open position, with a loaded pallet;

storage channel 1 "displayed".

The pallet is therefore to be transferred into channel 1, and switch CRP is set into position 27 for this purpose. Contact $V_1$ is closed, as well as $R_1$, since the transfer carriage is not yet in front of channel 1. $AR_3$ is closed as well, since the transfer carriage is the stop position. $ST_1$ is closed since the centering arms are open.

This results in the coil AV being energized and the transfer carriage being set into forward motion. When it arrives in front of channel 1, $R_1$ opens, which switches off AV. The carriage stops, and $AV_1$ and $AR_1$ close. $WO_1$ and FCF are closed, due to the fact that the jack is not yet in operation. WF is therefore energized, thus feeding the jack which begins to close the centering arms.

At the end of the jack closing stroke, FCF opens, thus switching off WF. The jack remain closed during the arm centering action. At the end of this action, XC closes and energizes electromagnet EA. The latter actuates the reverse motion of the transrobot. This actuation is carried out as follows: contact $RR_1$ is closed by a stop member 60 actuated by electromagnet EA, as can be seen by referring to FIG. 8.

The closing of $RR_1$ results, as described in the U.S. application referred to above, in the transrobot being set into reverse motion. The transrobot penetrates, in reverse motion, into the transfer carriage, closes PR and triggers MI, which is held through closing of contact $MI_2$. While continuing to move backwards in the transfer carriage, the transrobot meets, through its feeler, the edge of the pallet which is placed there, thus actuating its stopping action, the elevation of its plate and its setting into forward motion, with the pallet loaded onto said plate as described in said U.S. application.

After the release of the transrobot from the transfer carriage, the timing mechanism, which is in operation, closes its contact $MI_3$. At this moment, FCO is closed, since the jack is closed, so that WO is energized. Its energization is continued after the reopening of $MI_3$, through its contact $WO_2$. The jack actuates the opening of the centering arms, until the opening of contact FCO, which switches off WO. At the end of the arm opening action, ST is closed again. At this moment, $MI_4$ has not yet been reopened; $AV_2$ is closed since the transfer carriage is not in forward motion. O is closed. AR is therefore energized and continues to be so, after the opening of $MI_4$, though $AR_2$. The transfer carriage is therefore in reverse motion. AV cannot be switched on when this reverse motion is started, since $AR_3$ is then open. When the transfer carriage again reaches point A, it closes EV, which results, as explained above, in the cancellation of the display referring to the motion that has just ended. Then, at the end of the transfer carriage return stroke, contact O opens, which switches off AR AV 1, $AR_1$, ECF and $WO_1$ which are then closed, and WF is energized, which actuates the closing of the centering arms. The centering then occurs on loading channel 15. The transfer carriage is in standby, ready to receive, for example, a pallet to be transferred. The loading of a pallet results in the opening of the arms. Indeed, when the transrobot of channel 15 penetrates into the transfer, it closes PR and triggers MI in the manner explained above for a storage channel transrobot.

Similarly, the action of the timing mechanism switches on WO and thus actuates the opening of arms.

The transfer carriage, in the final analysis, has therefore returned to the set of conditions described at the beginning, and stands by for the display of this pallet's destination.

Instead of loading a pallet onto the carriage, it is possible to carry out a new storage channel display, so as to proceed to the removal, by the carriage, of the transrobot located in this channel, and to its setting into place in another channel. This transrobot channel switching operation takes place as follows:

Switch CRP is placed in position 26, so that cam 28 is located on the contact path TR, as explained above. The case in which loading channel 15 is empty will be considered first.

The transfer carriage is stopped at A, with arms in the open position.

Let 2 be the channel in which a transrobot is to be taken. $V_2$, therefore, is closed. $AR_3$ is closed since the transfer carriage is at the top position and $ST_1$ is closed, since the centering arms are open. Coil AV is therefore switched on, so that the empty transfer carriage leaves in forward motion. When it arrives in front of channel 2, cam 19 switches off $V_2$ so that coil AV is switched off and contact $AV_1$ closes. Coil WF is then switched on, TR, AR, FCF and $WO_1$ being closed at this moment. The jack, which is energized, as a result, closes the centering arms. At the end of the stroke, FCF opens and switches off WF. The jack is no longer energized and the centering arms line up the path of the transfer carriage with that of channel 2.

At the end of the closing operation, the centering arms have closed contact XC of channel 2, so that the electromagnet EA became energized. As was seen above, this results in the transrobot of channel 2 being set into reverse motion. By penetrating into the transfer carriage, this transrobot closes PR and triggers the timing mechanism MI, in a manner already previously described. When contact $RR_3$ reaches the previously mentioned cam, it becomes closed, which results (FIG. 4) in RK being switched on ($RA_4$ $V_4$ being normally closed). Contact $RK_1$ opens instantaneously, which switches off RAR; the transrobot of channel 2 is then stopped in the transfer carriage. The timing mechanism MI continues to operate, thus switching on WO, which actuates the opening of the arm in the previously described manner.

The transfer carriage is then loaded with a transrobot and its arms are opened. At the end of the opening operation, the arms have actuated ST, so that $ST_1$ and $ST_2$ are closed while $ST_3$ is open. The energization of coil AL is therefore switched off so that contacts $Al_1$ are opened, which switches off the feeding of the transrobot into the transfer carriage.

$ST_2$ being closed and MI 14 still being closed, coil AR is energized, so that the transfer carriage leaves in reverse motion towards A, in the previously described manner.

For reasons that have been indicated, it remains mobilized at A until a new display is set up. But the arms are not closed, since TR has encountered cam 28. $ST_1$ is therefore closed. It will then be assumed that channel 3, in which the transrobot is to be transferred, is displayed.

$ST_1$ being closed, the closing of $V_3$ switches top AV, and the transfer carriage is driven into forward motion, towards channel 3. When it arrives in front of this channel, $R_3$ opens, which causes the carriage to stop and WF to be switched on in the previously-described manner. The arms of the transfer carriage close, which causes $ST_3$ to close. Contacts $AV_3$ and $AR_4$ being then closed, since the carriage is at the stop position, coil AL is energized, so that duct 61 is being energized, $RR_3$ being closed, coil RK is switched on. After the delaying time, contact $RK_2$ closes, so that RMC is energized (FIG. 4): the transrobot plate then rises, until the closing of the top end of stroke contact $RH_1$. The transrobot then starts into forward motion, its plate being in a high position and leaves the transfer carriage.

The setting into forward motion of the transrobot causes the opening of contact $RA_4$ $V_4$, and therefore the switching off of energization of RK and, as a result, the opening of contact $RK_2$: the plate can therefore not go down again. The transrobot moves forwards in channel 3 until it meets an obstacle; it then effects its normal cycle.

At the moment in which it leaves the transfer carriage, the transrobot has actuated PR, thus triggering the time mechanism MI in the previously-described manner. As a result, $MI_3$ and $MI_4$ will successively actuate the opening of the arms and the setting into reverse motion of the transfer carriage towards point A, until, by actuating O, it returns to its initial position, as already explained. The case will now be considered in which the transfer carriage is stopped at A while the loading channel 15 is full. The transrobot of this channel then carries out automatically the loading of a pallet onto the transfer carriage. It is therefore necessary, in this case, that this pallet be transferred towards the storage channel for which it is intended, before the transfer of the transrobot may be effected.

This pallet transfer is effected in the previously described manner, but switch CRP being in position 26, cam 28 is therefore placed in the path of contact TR. As a result, upon return of the transfer carriage, contact TR is actuated, which prevents the closing of the arms. Now, since the displacement of the transrobot along channel 15 can be effected only when the arms are closed, the automatic loading of the pallets is interrupted and there is to be effected the transfer of a transrobot while the carriage is stopped, with arms open, at point A. The operation of the device has been described hereinabove, by referring to the input channel 13. The transfer carriage operates in a similar manner in the output channel 14, from the output of any one of the storage channels towards point E. When the transfer carriage stops in front of the storage channel displayed, the closing of the centering arms causes the closing of contact XCa and therefore the shutting off of the power supply for electromagnet EAa. This electromagnet retracts a catch 32 (FIGS. 2 and 5), which plays a role equivalent to a pallet when placed at the output end of channel 12. As a result, a contact 62 is closed, which switches on conductor 68. As a result, coil RT is switched on (contact RB being closed, since the plate of the transrobot is in low position).

Contact $RT_1$ closes, $RF_1$ is closed as well as $RA_2$ $R_2$ and $RR_2$, so that coil RAV is energized. The transrobot is therefore set into forward motion at a low position of the plate. It penetrates into the transfer carriage, reverses its motion on a forward end of stroke stop member, takes the first pallet and returns to set it down onto the transfer carriage. It then returns to the storage channel to effect a normal regrouping operation. The opening of the transfer carriage centering arm liberates XCa, thus placing the device in its initial conditions. The time of action of the timing mechanism MI is regulated so that the centering arms open before the transrobot will have returned with the next pallet. Similarly, loading channel 15 is equipped with a contact XCc which energizes an electromagnet EAc, which actuates a catch 32c, which closes a contact 62c.

FIGS. 5 to 8 show the transfer carriage, in a position at the input of a storage channel comprising tracks 33, 34, on which rolls a transrobot 36. The main chassis 37 of the transfer carriage moves on tracks 38, 39 of the input channel, by means of wheels 40 to 43 driven by a motor reducer unit 44 comprising a braking motor. The secondary chassis 45 rests on the main chassis and can move, with respect to the latter, by means of wheels 46 to 49. It supports cam 19, as well as two tracks 50, 51. Rollers 52—55 provide for its lateral guidance. Tracks 50, 51 have the same spacing as tracks 33, 34 and take up position in the latter's extension, as shown in FIG. 5, when the centering operation is completed. At this moment, electric duct 21 of the channel in which the transrobot is moving takes up position in the extension of a part of electric duct 61 (FIG. 5) attached to the secondary chassis, and energized by trolley 23 mentioned previously: the power supply for the transrobot is then provided by duct 20—61, which makes it possible for the transrobot to penetrate into the transfer carriage without any interruption in its energization.

The centering arms (referred to by reference numbers 24 and 25 in FIG. 2) each comprise an upper component (denoted by the letter $a$ in FIGS. 5 and 6) and a lower component (denoted by the letter $b$ in FIGS. 5 and 6) hinged onto a vertical axis (denoted by the letter $c$). The lower component, as seen in FIG. 5, is pushed by the piston of jack W, from the position shown as a solid line, termed "open position" in which it causes the main and secondary chassis to act in integral by means of a catch 56 (FIG. 6) which cooperates with a stop member 57 of the main chassis, to the position shown as a dotted line, termed "closed position," in which the secondary chassis can move with respect to the main chassis.

In this last position, it can be seen that the upper component, by abutting on rollers 58, 59, located outside tracks 33, 34, puts the latter into alignment on tracks 50, 51.

It was explained above that the stopping of the transfer carriage in front of the displayed storage channel is effected by the disconnection of AV. This disconnection results in the cutting off of the power supply to the braking motor of unit 44. The stopping of the main chassis evidently occurs with a certain amount of inaccuracy, which justifies the usefulness of the centering operation, carried out, as already explained, through the action of jack W.

Figure 8:
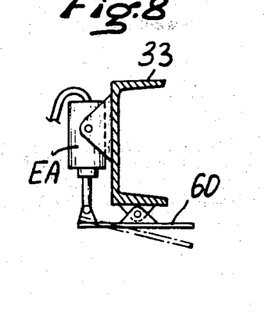
FIG. 8 shows the detail of electromagnet EA in FIG. 5.

FIG. 5 shows previously-mentioned contacts O, ST, PF and TR, attached to the main chassis 37, contact XC, attached to attack 33, in a position such that it may be closed by arm 24$a$, an electromagnet EA attached to track 33 as well. FIG. 8 shows that electromagnet EA actuates stop member 60, which itself actuates contact $RR_1$, as already explained.

It is self-evident that various modifications may be introduced into the device described and shown, and that various alternative applications are possible without departing from the spirit of the invention.

In particular the installation may comprise a transrobot for each storage channel, in which it is not necessary to provide, as was done in the above description, the component leading to the possibility of transferring a transrobot from one storage channel to another. In such a case, when the transferred carriage from the input channel stops in front of a storage channel in which a transrobot is effecting an accumulation of pallets, said carriage will wait until this accumulation is finished before being unloaded. On the other hand, the presence of the output channel transfer carriage will stop any accumulation operation being carried out in a storage channel, the transrobot acting to automatically load the transfer carriage before resuming its accumulation operation.

It should be emphasized that this invention is in no way limited to the use of a transrobot, as the transfer carriage, to which it relates, may be used to automatically displace loads from one storage channel to another, whatever the means used to displace said loads within the storage channels may be. Although some of the components described above apply more especially to the particularly advantageous case where a transrobot is used, he device can be adapted, provided certain easily conceived circuit modifications are made, to other dynamic transfer load equipment and there is, in point of fact, complete independence between the essential structure of the device of the invention and that of the transrobot.

As a general rule, the control electric circuits described, in spite of their own originality, will have to be modified or completed in certain applications.

It maybe contemplated, for example, by addition of equipment known per se, to replace the manual displaying operations by a preselection placing into memory several destinations, and establishing a channel loading program. It is also possible to replace the control of a sequential operation series by a control system for a cyclic series. When the installation comprises several levels, it is of course possible, to provide a lift so as to effect transfers from one level to another.

We claim:

1. A dynamic storage installation having at least one storage level which comprises a plurality of adjacent storage channels, an input channel and an output channel, said input and output channels being arranged substantially at right angles to the storage channels at the respective ends of the latter, said installation further including a load transfer carriage, at least one rail, track mounted in at least one of the said input and output channels, motor means for moving the said load transfer carriage along the said track, further rail tracks respectively arranged in the respective storage channels of said plurality, an auxiliary rail track mounted on said load transfer carriage transversely to the said rail track, control means cooperating with said motor means for stopping the load transfer carriage in a predetermined position at one end of any preselected one of the storage channels, and centering means cooperating with the load transfer carriage for putting in line the said auxiliary rail track with that of the further rail tracks which corresponds to the said preselected storage channel, wherein said control means include electric contacts fixedly mounted at the ends of the respective storage channels, a cam mounted on said load transfer carriage, said cam being adapted for operating any one of said contacts when the load transfer carriage is located in a position substantially facing the corresponding one of said storage channels, further electric contacts fixedly mounted at the ends of the respective storage channels, means for selectively operating any one of said further electric contacts and circuit means for controlling the operation of said motor means, said circuit and motor means being adapted for stopping the motion of the said load transfer carriage along the said rail track when one of said contacts and the corresponding further contact are both operated, whereby the load transfer carriage is stopped in the said position.

2. A dynamic storage installation as claimed in claim 1, wherein said load transfer carriage includes a first chassis, adapted to roll on the said rail track and comprising a roller track extending substantially parallel to the said rail track, and a second chassis adapted to roll on said roller track, said auxiliary rail track being mounted on said second chassis, said centering means comprising arms adapted to hinge on said first chassis from a first to a second position, said arms being adapted, in their first position, to lock said second chassis integrally with the first chassis and, in their second position, to free the second chassis for displacement along said roller track so as to effect the said alignment.

3. A dynamic storage installation as claimed in claim 1, wherein electric supply means are mounted parallel to each further rail track on the respective storage channels, further electric supply means being mounted parallel to said auxiliary rail on the load transfer carriage, said centering means being adapted for putting in line the said electric supply means and the said further electric supply means, said installation further including a load conveyor, further motor means for moving the said conveyor along any one of the said further rail tracks, said further motor means being energized from said electric supply means, said load transfer carriage being adapted for receiving the said conveyor and the said electric supply means and further electric supply means being so arranged when in alignment that the conveyor will penetrate into the transfer carriage while its energization is being continued.